United States Patent

[11] 3,579,087

[72] Inventor  Owen E. Reinert
            St. Louis County, Mo.
[21] Appl. No. 840,544
[22] Filed    Dec. 31, 1968
            Division of Ser. No. 568,210, July 27, 1966,
            Pat. No. 3,470,456.
[45] Patented May 18, 1971
[73] Assignee Sperry Rand Corporation
            New York, N.Y.

[54] GENERATOR SEMICONDUCTOR VOLTAGE
    REGULATOR
    8 Claims, 1 Drawing Fig.
[52] U.S. Cl. .................................................. 322/28,
                                            322/73, 323/22
[51] Int. Cl. ...................................................... H02p 9/30

[50] Field of Search .......................................... 322/28, 36,
                                            73; 323/22 (T), (SCR)

[56]              References Cited
            UNITED STATES PATENTS
3,173,077  3/1965  Kirk et al ...................  322/28X Primary Examiner—Oris L. Rader
Assistant Examiner—H. Huberfeld
Attorney—Kingsland, Rogers, Ezell, Eilers & Robbins ABSTRACT: A silicon controlled rectifier, which is connected to the field winding of a generator, has the firing angle thereof controlled by a firing circuit which includes a capacitor; and a second silicon controlled rectifier stores inhibiting energy in that capacitor to vary the firing angle of the first said silicon controlled rectifier.

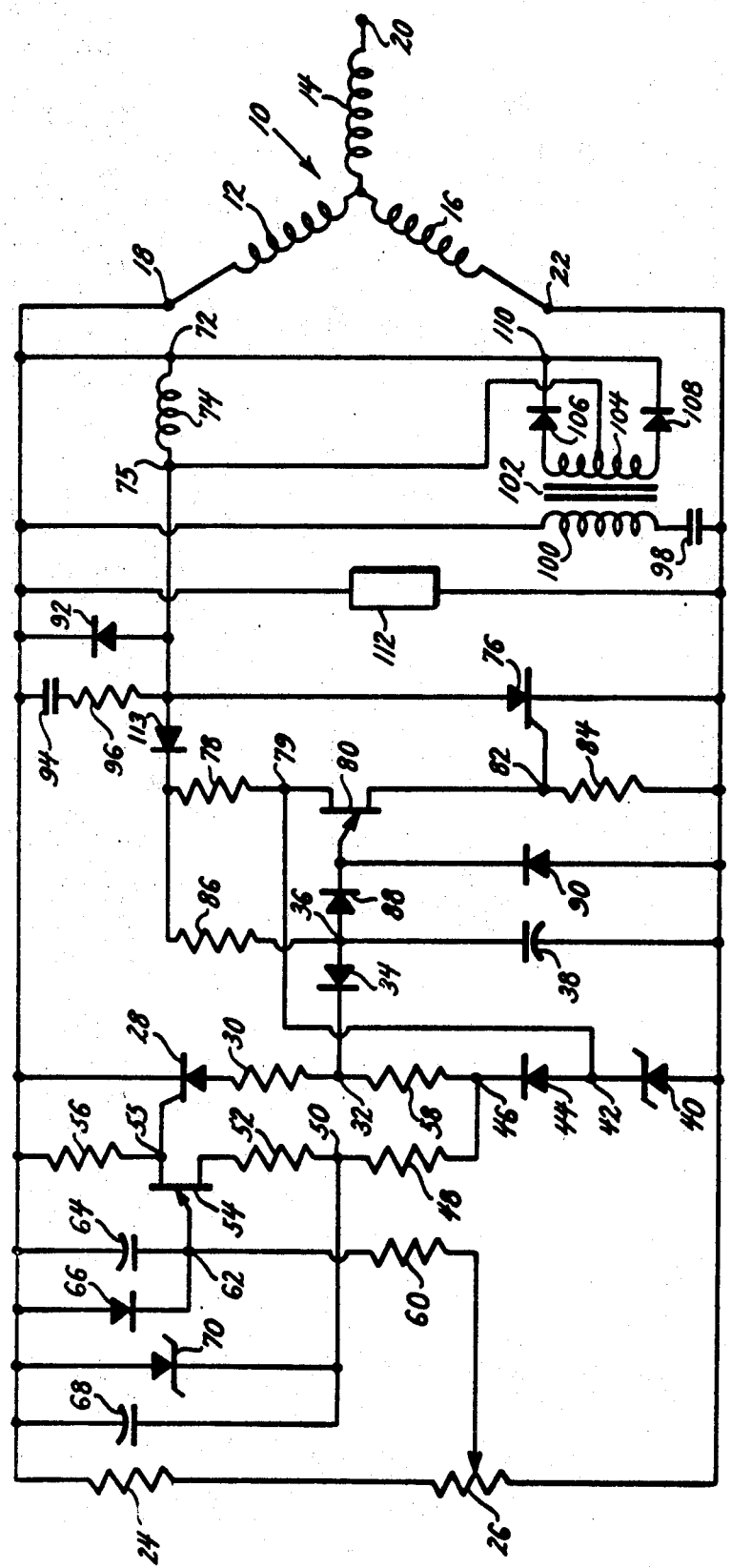

GENERATOR SEMICONDUCTOR VOLTAGE REGULATOR

This is a division of application Ser. No. 568,210 filed July 27, 1966, now U.S. Pat. No. 3,470,456.

This invention relates to improvements in control systems. More particularly, this invention relates to improvements in control systems for electric generators.

It is, therefore, an object of the present invention to provide an improved control system for an electric generator.

It is customary to provide control systems, for electric generators, which can regulate the output voltages of those electric generators; and it is becoming increasingly desirable to make those control systems with solid-state components. Where that is done, undesirable variations in output voltage due to the sticking of contacts and due to the inertia of moving parts can be obviated. However, the use of solid-state components in a control system for an electric generator forces that electric generator, at "startup," to develop a predetermined minimum output voltage so that control system can begin to perform its control function. Where an electric generator is self-excited, the residual magnetism in that electric generator is usually relied upon to provide the magnetic flux lines needed to enable that electric generator to develop the said predetermined minimum output voltage at "startup"; and that residual magnetism can be so small that some electric generators will be slow in developing and may even be unable to develop, the said predetermined minimum output voltage. It would be desirable to provide a control system, for a self-excited electric generator, which used solid-state components but which could promptly respond to the very low output voltages developed by that electric generator at "startup." The present invention provides such a control system; and that control system has a capacitor and the primary winding of a transformer connected in series across the output of the electric generator, and it has the secondary winding of that transformer connected to the field winding of that electric generator. The secondary winding of that transformer will respond to the flow of current through the primary winding to cause current to flow through the field winding of the electric generator; and the resulting increase in magnetic flux lines in that electric generator will increase the output voltage of that electric generator. Very quickly, that output voltage will exceed the predetermined minimum value which is needed to enable the control system to perform its control function. If the capacitor and the primary winding of the transformer are made to constitute a series-resonant circuit which is resonant at the frequency of the output voltage of the electric generator, that series-resonant circuit will have a minimal impedance value at the frequency of the output voltage of the electric generator. In that event, even very low output voltages at "startup," which would be due to the residual magnetism in the electric generator, cold-cause current to flow through the primary winding of the transformer. It is, therefore, an object of the present invention to provide a control system, for a self-excited electric generator, which has a capacitor and the primary winding of a transformer connected in series across the output of that electric generator, and which has the secondary winding of that transformer connected to the field winding of the electric generator to force current to flow through that field winding.

The control system provided by the present invention renders the series-connected capacitor and primary winding ineffective after the output voltage of the electric generator reaches a predetermined value below the normal value of that output voltage. This is desirable, because otherwise that series-connected capacitor and primary winding would progressively increase the value of the current flowing through the field winding of the electric generator, and would thus progressively increase the output voltage of that electric generator. The present invention renders the series-connected capacitor and primary winding of the control system ineffective by causing the core of the transformer to saturate as the output voltage of the electric generator reaches the said predetermined value below the normal value of that output voltage; and, once that transformer has saturated, the series-connected capacitor and primary winding cannot act to increase the value of the current flowing through the field winding. This means that the series-connected capacitor and primary winding of the control system provided by the present invention can respond to very low values of output voltage at "startup" to force current to flow through the field winding of the electric generator, and can be rendered ineffective after the output voltage of that electric generator has reached a predetermined value below the normal value of that output voltage. It is, therefore, an object of the present invention to provide a control system, for a self-excited electric generator, which has a transformer that is part of a current-forcing circuit and that becomes saturated to render that current-forcing circuit ineffective after the output voltage of the electric generator has reached a predetermined value below the normal value of that output voltage.

It would be desirable to provide a control system for an electric generator which could be readily adjusted to adjust the output voltage of that electric generator. The present invention provides such a control system; and it does by using a primary variable impedance to adjust the lengths of time during which power is supplied to the field winding of the electric generator, and by using a smaller variable impedance to adjust the firing angle of that primary variable impedance. An inexpensive and easily adjusted control can be adjusted to adjust the firing angle of the smaller variable impedance—and thereby adjust the firing angle of the primary variable impedance. As a result, the mere adjustment of an inexpensive and easily adjusted control can control the output voltage of the electric generator. It is, therefore, an object of the present invention to provide a control system for an electric generator wherein a primary variable impedance is used to adjust the lengths of time during which power is supplied to the field winding of that electric generator, wherein a smaller variable impedance is used to adjust the firing angle of that primary variable impedance, and wherein an inexpensive and easily adjusted control is used to adjust the firing angle of that smaller variable impedance.

The variable impedances used in one preferred embodiment of the control system provided by the present invention are controlled rectifiers; and the inexpensive and easily adjusted control is a potentiometer. The controlled rectifier that serves as the primary variable impedance of the control system is connected in series with the field winding of the alternating current generator; and it is selectively rendered conductive to supply power to that field winding. The controlled rectifier that serves as the smaller variable impedance is selectively rendered conductive to store an inhibiting charge in a capacitor in the firing circuit of the primary variable impedance; and the "on" time of that controlled rectifier determines the value of that inhibiting charge, and thus the "on" time of that primary variable impedance. The potentiometer controls the "on" time of the controlled rectifier that serves as the smaller variable impedance, and thus also controls the "on" time of the primary variable impedance. The use of the potentiometer and the two controlled rectifiers enables the control system to "fire" the primary variable impedance at firing angles greater than as well as less than 90°. Also, the use of the potentiometer and the two controlled rectifiers obviates all need of amplification in the firing circuits of those controlled rectifiers, provides rapid response to adjustments of the position of the movable contact of the potentiometer, and enables the triggering circuit of the control system to act as a sensing circuit as well as a triggering circuit.

Other and further objects and advantages of the present invention should become apparent from an examination of the drawing and accompanying description.

In the drawing and accompanying description, a preferred embodiment of the present invention is shown and described, but it is to be understood that the drawing and accompanying description are for the purpose of illustration only and do not limit the invention and that the invention will be defined by the appended claims.

The drawing is a schematic diagram of an electric generator and of one preferred embodiment of control system therefor that is made in accordance with the principles and teachings of the present invention.

Referring to the drawing in detail, the numeral 10 generally denotes the armature winding of a three phase alternating current generator. The phases of that armature winding are denoted by the numerals 12, 14 and 16; and those phases are wye-connected. The outer end of the phase 12 is connected to output terminal 18 of the generator, the outer end of the phase 14 is connected to output terminal 20 of that generator, and the outer end of the phase 16 is connected to output terminal 22 of that generator. Those output terminals will be connected to a load, not shown. The rotor of the generator will be driven by a prime mover, not shown.

A resistor 24 and a potentiometer 26 are connected in series across the output terminals 18 and 22 of the generator. A controlled rectifier 28, a resistor 30, a junction 32, a diode 34, a junction 36, and a capacitor 38 also are connected in series across the output terminals 18 and 22 of the generator. Further a Zener diode 40, a junction 42, a diode 44, a junction 46, a resistor 48, a junction 50, a resistor 52, a unijunction transistor 54, a junction 55, and a resistor 56 are connected in series across the output terminals 18 and 22 of the generator. The junction 55 is connected to the gate of the controlled rectifier 28; and that controlled rectifier preferably is a silicon controlled rectifier. A resistor 58 is connected intermediate the junctions 32 and 46. A resistor 60, a junction 62, and a capacitor 64 are connected in series between the movable contact of the potentiometer 26 and the output terminal 18 of the generator. The junction 62 is connected to the emitter of the unijunction transistor 54. A diode 66 is connected in parallel with the capacitor 64; and the anode of that diode is connected to the output terminal 18.

A Zener diode 70 is connected between the junction 50 and the output terminal 18 of the generator; and hence that Zener diode is connected in parallel with the series-connected resistor 52, unijunction transistor 54, junction 55, and resistor 56. A capacitor 68 is connected in parallel with the Zener diode 70.

A junction 72, the field winding 74 of the alternating current generator, a junction 75, and a controlled rectifier 76 are connected in series across the output terminals 18 and 22 of the generator. Preferably, that controlled rectifier is a silicon controlled rectifier. A diode 113, a resistor 78, a junction 79, a unijunction transistor 80, a junction 82, and a resistor 84 are connected in series between the junction 75 and the output terminal 22 of the alternating current generator; and the anode of that diode is directly connected to the junction 75. A resistor 86 is connected between the diode 113 and the junction 36, and thus is connected in series with the capacitor 38 between that diode and terminal 22. A diode 88 is connected between the junction 36 and the emitter of the unijunction transistor 80; and a diode 90 is connected between the output terminal 22 of the generator and that emitter. The cathodes of the diodes 98 and 90 are connected to each other and to the emitter of the unijunction transistor 80.

A diode 92 is connected between the junction 75 and the output terminal 18 of the generator, and thus is connected in parallel with the field winding 74. A capacitor 94 and a resistor 96 are connected in series with each other and in parallel with the diode 92.

The primary winding 100 of a voltage stepdown transformer 102 and a capacitor 98 are connected in series across the output terminals 18 and 22 of the alternating current generator. The numeral 104 denotes the center-tapped secondary winding of the transformer 102; and the center-tap of that secondary winding is connected to the junction 75. The upper end of the secondary winding 104 is connected to the junction 72 by a diode 106 and a junction 110; and the lower end of that secondary winding is connected to that junction by a diode 108 and the junction 110. The numeral 112 denotes a salenium transient voltage suppressor, of standard and usual design, which is connected across the output terminals 18 and 22 of the alternating current generator.

During the operation of the alternating current generator shown in the drawing, the voltage at the output terminal 22 will recurrently become positive relative to the voltage at the output terminal 18; and the voltage at the output terminal 18 will recurrently become positive relative to the voltage at the output terminal 22. When the voltage at the output terminal 22 is positive relative to the voltage at the output terminal 18, current will flow from the output terminal 22 via the lower section of potentiometer 26, and then either through the upper section of that potentiometer and the resistor 24 to the output terminal 18 or through the movable contact of that potentiometer, the resistor 60, junction 62, and capacitor 64 to that output terminal. The current flow through the capacitor 64 will make the lower terminal of that capacitor positive. Current also will flow from the output terminal 22 via the capacitor 98 and the primary winding 100 of transformer 102 to the output terminal 18; and that flow of current through that primary winding will cause current to flow through the lower section of the secondary winding 104 of that transformer, through the diode 108, junctions 110 and 72, field winding 74, and the junction 75 to the center-tap of that secondary winding. Further, current may flow from output terminal 22 via Zener diode 40, junction 42, diode 44, junction 46, resistor 48, junction 50, and capacitor 68 to the output terminal 18; and that current flow would make the lower terminal of that capacitor positive.

Current will tend to flow from the output terminal 22 via controlled rectifier 76, junction 75, field winding 74, and junction 72 to the output terminal 18; but that controlled rectifier will block any such flow of current. Current will also tend to flow from the output terminal 22 via resistor 84, unijunction transistor 80, junction 79, resistor 78, diode 113, junction 75, field winding 74, and junction 72 to the output terminal 18; but that diode will block any such current flow. Moreover, current will tend to flow from the output terminal 22 via capacitor 38, junction 36, diode 34, junction 32, resistor 30, and controlled rectifier 28 to the output terminal 18; but that controlled rectifier will initially be nonconductive. Furthermore, current will tend to flow from output terminal 22 via Zener diode 40, junction 42, diode 44, junction 46, resistor 58, junction 32, resistor 30, and controlled rectifier 28 to the output terminal 18. Because the controlled rectifier 28 is initially nonconductive, substantially no current will flow through Zener diode 40 and diode 44 and that controlled rectifier. The Zener diode 70 is in parallel with the capacitor 68; but that Zener diode will pass substantially no current until the voltage across it exceeds 15 volts.

At the time the alternating current generator is turned "on," the rotor of that generator will be rotating at, or close to, its intended speed; and the residual magnetism in that generator will be relied upon to provide the magnetic flux lines that will pass through the turns of the phases 12, 14 and 16 of the armature winding. Because the residual magnetism in alternating current generators is quite small—usually between one-half of a percent and 5 percent of the operating magnetic flux—the initial voltage between the output terminals 18 and 22 will be very small. However, the capacitance of the capacitor 98 and the inductance of the primary winding 100 of the transformer 102 are preferably selected so that capacitor and that primary winding constitute a series-resonant circuit which will be resonant at the frequency of the output voltage of the generator. This is very desirable, because the impedance of a series-resonant circuit is essentially the ohmic resistance of the inductor of that circuit when a voltage with the characteristic resonant frequency of that circuit is applied to it; and the ohmic resistance of the primary winding 100 is very low. The overall result is that even a very small initial voltage between the output terminals 22 and 18 will be large enough to cause current to flow through the primary winding 100 of the transformer 102. The transformer 102 is a voltage stepdown transformer; and any current flow through the primary winding 100 thereof will cause a greater current flow through the secondary winding thereof. As a result, even a small value of current flowing through the primary winding 100 will enable the lower section of the center-tapped secondary winding 104 to force current to flow through the diode 108 and the field winding 74. The resulting flux lines generated by that field winding will augment the residual magnetism in the alternating current generator, and will provide an overall magnetic field that will enable the phases 12, 14 and 16 of the armature winding 10 to increase the voltage across the output terminals 18 and 22.

If the voltage across the output terminals 22 and 18 in great enough, current will flow through Zener diode 40, junction 42, diode 44, junction 46, resistor 48, junction 50, and capacitor 68; and that current flow will develop a voltage across that capacitor. Simultaneously, current will flow through the lower section of potentiometer 26, resistor 60, junction 62, and capacitor 64; and that current flow will develop a voltage across that capacitor. If the voltage across the capacitor 68 fails to approach 15 volts, the unijunction transistor 54 will not deliver a turn-on pulse to the gate of the controlled rectifier 28; and hence that controlled rectifier will remain nonconductive. As a result, very little current will flow through the capacitor 38; and the charge stored within that capacitor will be very small.

When the voltage at the output terminal 18 subsequently becomes positive relative to the voltage at the output terminal 22, current will flow from the output terminal 18 via resistor 24 and potentiometer 26 to the output terminal 22; but that current flow will not be significant. Current also will flow from output terminal 18 via parallel-connected capacitor 64 and diode 66, junction 62, resistor 60, and the lower section of potentiometer 26 to the output terminal 22; and that current flow will discharge that capacitor and then tend to charge that capacitor with the upper terminal thereof positive. However, the diode 66 will serve as a parallel-connected low impedance, and will thus limit the voltage across that capacitor to less than a volt. Current additionally will flow from output terminal 18 via junction 72, field winding 74, junction 75, diode 113, resistor 86, junction 36 and capacitor 38; and that current flow will discharge that capacitor and then charge that capacitor with the upper terminal thereof positive. Further, current will flow from output terminal 18 via primary winding 100 of transformer 102 and capacitor 98 to the output winding 22; and that flow of current through that primary winding will cause current to flow through the upper section of the secondary winding 104 of that transformer, through diode 106, junctions 110 and 72, field winding 74, and the junction 75 to the center-tap of that secondary winding. The resulting flux lines generated by that field winding will further augment the residual magnetism in the alternating current generator, and will provide an overall magnetic field that will enable that phases 12, 14 and 16 of the armature winding 10 to increase the voltage across the output terminals 18 and 22.

Current will tend to flow through parallel-connected capacitor 68 and Zener diode 70, junction 50, resistor 48, and junction 46 to the output terminal 22; but the diodes 34 and 44 will block any such current flow. Current also will tend to flow from output terminal 18 via resistor 56, junction 55, unijunction transistor 54, resistor 52, junction 50, resistor 48, and junction 46 to the output terminal 22, but the diodes 34 and 44 will block any such current flow. Similarly, current will tend to flow from the output terminal 18 via controlled rectifier 28, resistor 30, and junction 32 to the output terminal 22; but that controlled rectifier and the diodes 34 and 44 will block any such current flow. Further, current will tend to flow from output terminal 18 via junction 72, field winding 74, junction 75, and controlled rectifier 76 to the output terminal 22; but that controlled rectifier will be nonconductive. Similarly, current will tend to flow from the output terminal 18 via junction 72, field winding 74, junction 75, diode 113, resistor 78, junction 79, the base-two base-one circuit of the unijunction transistor 80, junction 82, and resistor 84 to the output terminal 22. Moreover, current will tend to flow from the output terminal 18 via junction 72, field winding 74, junction 75, diode 113, resistor 78, junction 79, junction 42, and Zener diode 40 to the output terminal 22; but current will not be able to flow through that Zener diode until the voltage across that Zener diode exceeds 15 volts.

If the voltage across the Zener diode 40 fails to approach 15 volts, the unijunction transistor 80 will not deliver a turn-on pulse to the gate of the controlled rectifier 76; and hence that controlled rectifier will remain nonconductive. As a result, very little current will flow through field winding 74 and then through the controlled rectifier 76.

When the voltage at the output terminal 22 again becomes positive relative to the voltage at the output terminal 18, current will again flow from the output terminal 22 via the lower section of potentiometer 26, and then either through the upper section of that potentiometer and the resistor 24 to the output terminal 18 or through the movable contact of that potentiometer, the resistor 60, junction 62, and capacitor 64 to that output terminal. That current flow through that capacitor will again make the lower terminal of that capacitor positive. Current again will flow from the output terminal 22 via the capacitor 98 and the primary winding 100 of transformer 102 to the output terminal 18; and that flow of current through that primary winding will cause current to flow through the lower section of the secondary winding 104 of that transformer, through the diode 108, junctions 110 and 72, field winding 74, and the junction 75 to the center-tap of that secondary winding. The resulting flux lines generated by that field winding will additionally augment the residual magnetism in the alternating current generator, and will provide an overall magnetic field that will enable the phases 12, 14 and 16 of the armature winding to increase the voltage across the output terminals 18 and 22. Current again may flow from output terminal 22 via Zener diode 40, junction 42, diode 44, junction 46, resistor 48, junction 50, and capacitor 68 to the output terminal 16; and that current flow would make the lower terminal of that capacitor positive.

If the voltage across the parallel-connected Zener diode 70 and capacitor 68 closely approaches 15 volts, the voltage across the base-two base-one circuit of the unijunction transistor 54 will approach 15 volts. If the current flowing through the lower section of potentiometer 26, resistor 60, and capacitor 64 causes the voltage across that capacitor to exceed the emitter peak point voltage of the unijunction transistor 54, that unijunction transistor will become conductive. Thereupon, the capacitor 64 will discharge through the emitter base-one circuit of that unijunction transistor and resistor 56; and the resulting voltage drop across the resistor 56 will cause sufficient current to flow through the gate-to-cathode circuit of the controlled rectifier 28 to render that controlled rectifier conductive. At this time, current will flow from the output terminal 22 via Zener diode 40, junction 42, diode 44, junction 46, resistor 58, junction 32, resistor 30, and controlled rectifier 28 to the output terminal 18. Importantly, current will flow from the output terminal 22 via capacitor 38, junction 36, diode 34, junction 32, resistor 30, and controlled rectifier 28 to the output terminal 18; and that flow of current will charge the capacitor 38 with the upper terminal thereof negative and with the lower terminal thereof positive. That charge on that capacitor will inhibit subsequent firing of the unijunction transistor 80, because it will make the emitter of that unijunction transistor negative relative to the base-one of that unijunction transistor. In inhibiting the subsequent firing of the unijunction transistor 80, the charge on the capacitor 38 also inhibits subsequent firing of the controlled rectifier 76.

When the voltage at the output terminal 18 again becomes positive relative to the voltage at the output terminal 22, current will tend to flow inversely through the controlled rectifier 28; and, if that controlled rectifier has not already become nonconductive, it will then become nonconductive. Also as the voltage at output terminal 18 again becomes positive relative to the voltage at output terminal 22, current again will flow from output terminal 18 via resistor 24 and potentiometer 26 to output terminal 22; but, again, that current flow will not be significant. Current will again flow from output terminal 18 via parallel-connected capacitor 64 and diode 66, junction 62, resistor 60, and the lower section of potentiometer 26 to output terminal 22; and that current flow will charge that capacitor with the upper terminal thereof positive. However, diode 66 will serve as a parallel-connected low impedance, and will thus limit the voltage across that capacitor to less than a volt. Additionally, current again will flow from output terminal 18 via junction 72, field winding 74, junction 75, diode 113, resistor 86, junction 36, and capacitor 38; and that current flow will discharge that capacitor and then charge that capacitor with the upper terminal thereof positive. Further, current again will flow from output terminal 18 via primary winding 100 of the transformer 102 and capacitor 98 to the output winding 22; and that flow of current through that primary winding will cause current to flow through the upper section of the secondary winding 104 of that transformer, through diode 106, junctions 110 and 72, field winding 74, and the junction 75 to the center-tap of that secondary winding. The resulting flux lines generated by that field winding will again augment the residual magnetism in the alternating current generator, and will provide an overall magnetic field that will enable the phases 12, 14 and 16 of the armature winding to increase the voltage across the output terminals 18 and 22.

If the voltage across the output terminals 18 and 22 is great enough to make the voltage across the Zener diode 40 15 volts, the voltage at base-two of the unijunction transistor 80 will be approximately 15 volts. If the voltage across the output terminals 18 and 22 is great enough to cause the flow of current through field winding 74, diode 113, resistor 86, and capacitor 38 to discharge that capacitor and then recharge that capacitor so the upper terminal thereof is positive and so that voltage across that capacitor exceeds the emitter peak point voltage of the unijunction transistor 80, that unijunction transistor will become conductive. Thereupon, capacitor 38 will discharge through diode 88, the emitter base-one circuit of unijunction transistor 80, and resistor 84; and the resulting voltage drop across the resistor 84 will cause sufficient current to flow through the gate-to-cathode circuit of the controlled rectifier 76 to render that controlled rectifier conductive. At this time, a substantial amount of current will flow from output terminal 18 via junction 72, field winding 74, junction 75, and controlled rectifier 76 to the output terminal 22; and that flow of current will supply an appreciable amount of energy to the field winding 74. Current will continue to flow through the controlled rectifier 76 substantially as long as the voltage at the output terminal 18 remains positive relative to the voltage at the output terminal 22. The resulting current flowing through the field winding 74 will sharply increase the voltage across the output terminals 18 and 22.

When the voltage at the output terminal 22 once again becomes positive relative to the voltage at the output terminal 18, current will tend to flow inversely through the controlled rectifier 76; and, if that controlled rectifier has not already become nonconductive, it will then become nonconductive. Also, as the voltage at the output terminal 22 again becomes positive relative to the voltage at the output terminal 18, current flowing through the lower section of potentiometer 26, resistor 60, and capacitor 64 will once again render the unijunction transistor 54 conductive; and the controlled rectifier 28 will once again become conductive. Thereupon, the current flowing from output terminal 22 via capacitor 38, junction 36, diode 34, junction 32, resistor 30, and controlled rectifier 28 to the output terminal 18 will once again charge that capacitor with the upper terminal thereof negative. Also as the voltage at the output terminal 22 becomes positive relative to the voltage at the output terminal 18, current will once again flow through the series-resonant circuit consisting of the capacitor 98 and the primary winding 100 of the transformer 102; and that current flow will cause current to flow through the lower section of the secondary winding 104 and through the field winding 74.

When the voltage at the output terminal 18 once again becomes positive relative to the voltage at the output terminal 22, current will tend to flow inversely through the controlled rectifier 28; and, if that controlled rectifier has not already become nonconductive, it will then become nonconductive. Also, as the voltage at the output terminal 18 again becomes positive relative to the voltage at the output terminal 22, current will once again flow through field winding 74, diode 113, resistor 86, and capacitor 38 to discharge that capacitor and then charge that capacitor with the upper terminal thereof positive. As the voltage across that capacitor once again reaches the emitter peak point voltage of the unijunction transistor 80, that unijunction transistor will once again become conductive. The resulting voltage drop across the resistor 84 will then cause sufficient current to flow through the gate-to-cathode circuit of the controlled rectifier 76 to render that controlled rectifier conductive once again; and a further appreciable amount of current will flow through field winding 74 and that controlled rectifier. That current flow will further increase the voltage across the output terminals 18 and 22.

During each half-cycle, of the voltage across the output terminals 18 and 22, wherein the output terminal 22 is positive relative to the output terminal 18, the controlled rectifier 28 will be rendered conductive to store an inhibiting charge in the capacitor 38. During each half-cycle, of the voltage across the output terminals 18 and 22, wherein the output terminal 18 is positive relative to the output terminal 22, the current flowing through field winding 74, diode 113, resistor 86, and capacitor 38 will dissipate that inhibiting charge and will then charge that capacitor sufficiently to render the unijunction transistor 80, and hence the controlled rectifier 76, conductive. When the voltage across the output terminals 18 and 22 reaches the desired level, the values of the inhibiting charges stored within the capacitor 38 during the half-cycles when the output terminal 22 is positive will permit the controlled rectifier 76 to have just enough "on" time to keep that voltage at that desired level.

If the voltage across the output terminals 18 and 22 tends to exceed the desired level, the capacitor 64 will charge more rapidly, and the unijunction transistor 54, and hence the controlled rectifier 28, will be rendered conductive earlier; and the resulting longer "on" time of the controlled rectifier 28 will provide a larger inhibiting charge within the capacitor 38. That larger inhibiting charge will delay the discharging and recharging of the capacitor 38, and thus will delay the firing of the unijunction transistor 80, and hence of the controlled rectifier 76. The consequent shorter "on" time of the controlled rectifier 76 will reduce the amount of energy supplied to the field winding 74, and will thus cause the voltage across the output terminals 18 and 22 to drop to the desired value.

Conversely, if the voltage across the output terminals 18 and 22 tends to fall below the desired level, the capacitor 64 will charge less rapidly, and the unijunction transistor 54, and hence the controlled rectifier 28, will be rendered conductive later; and the resulting shorter "on" time of the controlled rectifier 28 will provide a smaller inhibiting charge within the capacitor 38. That smaller inhibiting charge will speed up the discharging and recharging of the capacitor 38, and thus will speed up the firing of the unijunction transistor 80, and hence of the controlled rectifier 76. The consequent longer "on" time of the controlled rectifier 76 will increase the amount of energy supplied to the field winding 74, and will thus cause the voltage across the output terminals 18 and 22 to rise to the desired value.

The controlled rectifier 76 can cause current to flow through the field winding 74 only when that controlled rectifier is conductive. However, current will tend to flow through that field winding after that controlled rectifier becomes nonconductive. Specifically the inductive energy which is stored within the field winding 74, while the controlled rectifier 76 is conductive, will cause current to flow from junction 75 via diode 92 and junction 72 to and through that field winding. That current flow will substantially sustain the magnetic field which was developed by that field winding while the controlled rectifier 76 was conductive.

Prior to the time the output voltage of the alternating current generator reaches its normal value, the value of the current flowing through the primary winding 100 of the transformer 102 will be great enough to cause the core of that transformer to saturate. Thereafter, that transformer will supply substantially no appreciable additional amounts of current to the field winding 74. This is important; because it will keep the series-resonant circuit constituted by the capacitor 98 and the primary winding 100 of the transformer 102 from progressively increasing the amount of current flowing through the field winding 74.

As the voltage across the output terminals 18 and 22 increases, the voltage across the serially connected field winding 74, diode 113, resistor 78, and Zener diode 40 will increase; and the voltage across the serially connected Zener diode 40, diode 44, resistor 48 and Zener diode 70 will increase. However, the Zener diode 40 will keep the voltage thereacross from exceeding about 15 volts, and will thus limit the base-two voltage of the unijunction transistor 80 to that value. Similarly, the Zener diode 70 will keep the voltage thereacross from exceeding about 15 volts, and will thus limit the base-two voltage of the unijunction transistor 54 to that value. The capacitor 68 will tend to keep the voltage across the Zener diode 70 substantially constant despite the alternations of polarity of the output terminals 18 and 22. This is desirable; because it will keep the voltage across that Zener diode from decreasing, at the ends of the half-cycles wherein the output terminal 22 is positive relative to the output terminal 18, sufficiently to permit undesirably low voltages across the capacitor 64 to exceed the emitter peak point voltage of that unijunction transistor.

The capacitance of the capacitor 64, the resistance of the resistor 60, and the resistance of the potentiometer 26 are selected so the "on" time of the controlled rectifier 76 can be adjusted to provide a desirable range of output voltages for the alternating current generator. By moving the movable contact of the potentiometer 26 upwardly toward the upper end of that potentiometer, the charging time of the capacitor 64 can be lengthened; and hence the unijunction transistor 54 and the controlled rectifier 28 will be rendered conductive later in those half-cycles wherein the voltage at the output terminal 22 is positive relative to the voltage at the output terminal 18. The later firing of that controlled rectifier will decrease the amount of inhibiting charge stored in the capacitor 38 during those half-cycles. As a result, that inhibiting charge will be quickly dissipated during those half-cycles wherein the voltage at the output terminal 18 is positive relative to the voltage at the output terminal 22; and hence the unijunction transistor 80, and the controlled rectifier 76, will become conductive earlier in those half-cycles. Consequently, current will flow from the output terminal 18 via junction 72, field winding 74, junction 75, and controlled rectifier 76 to the output terminal 22 for a longer period of time during each of those half-cycles. That longer current flow will increase the output voltage of the alternating current generator; and the control system will then hold that output voltage substantially constant at that increased level. This means that the mere upward adjustment of the position of the movable contact of potentiometer 26 will shift the output voltage of the alternating current generator from one regulated level to a higher regulated level.

Conversely, when the movable contact of potentiometer 26 is moved downwardly toward the lower end of that potentiometer, the charging time of the capacitor 64 will be decreased; and hence the unijunction transistor 54 and the controlled rectifier 28 will become conductive earlier in the half-cycles wherein the voltage at the output terminal 22 is positive relative to the voltage at the output terminal 18. The earlier firing of that controlled rectifier will increase the amount of inhibiting charge stored in the capacitor 38 during those half-cycles. As a result, it will take longer, during those half-cycles wherein the voltage at the output terminal 18 is positive relative to the voltage at the output terminal 22, to discharge the capacitor 38 and then charge that capacitor with the upper terminal thereof positive. The longer time required to discharge the capacitor 38 and then to charge that capacitor with the upper terminal thereof positive will cause the unijunction transistor 80 and the controlled rectifier 76 to become conductive later in the half-cycles wherein the voltage at the output terminal 18 is positive relative to the voltage at the output terminal 22. The resulting reduction in the lengths of the periods of time during which current flows from output terminal 18 via junction 72, field winding 74, junction 75 and controlled rectifier 76 to the output terminal 22 will reduce the output voltage of the alternating current generator; and the control system will then hold that output voltage substantially constant at that reduced level. This means that the mere downward adjustment of the position of the movable contact of potentiometer 26 will shift the output voltage of the alternating current generator from one regulated level to a lower regulated level.

The response of the control system provided by the present invention to adjustments of the position of the movable contact of the potentiometer 26 is extremely rapid. Specifically, when, in one half-cycle of the voltage across output terminals 18 and 22, an adjustment of the position of that movable contact changes the inhibiting charge in the capacitor 38, the "on" time of the controlled rectifier 76 will be changed during the very next half-cycle of that voltage.

The use of the capacitor 98 and the primary winding 100 of the transformer 102 is very important; because it causes current to flow through the field winding 74 of the alternating current generator even when the output voltage of that generator is due to residual magnetism, and hence is low. By making that capacitor and that primary winding so they constitute a series-resonant circuit, the present invention enables even very low generator output voltages to cause current to flow through the field winding 74. The saturable nature of the core of transformer 102 is important; because it keeps that transformer from continuing to force current to flow through the field winding 74 after the output voltage of the alternating current generator has attained a predetermined level below the lowest range of that output voltage.

The surge suppressor 112 is useful in keeping high voltage transients, that may develop in the alternating current generator, from damaging the solid-state components of the control system. The series-connected capacitor 94 and resistor 96 are useful in suppressing transient oscillations which might tend to develop as inductive energy was recurrently stored within and dissipated by the field winding 74.

The diode 90 and the diode 88 are helpful in protecting the base-one emitter circuit of the unijunction transistor 80 from injury when the output terminal 22 is positive relative to the output terminal 18. Specifically, the diode 90 is connected in parallel with series-connected resistor 84 and the base-one emitter circuit of the unijunction transistor 80; and it is connected in series with the diode 88 and the resistor 86. Whenever the output terminal 22 is positive relative to the output terminal 18, the voltage drop across the diode 90 will be very small, and the voltage drop across the base-one emitter circuit of the unijunction transistor 80 will be even smaller. As a result, that base-one emitter circuit will be protected against injury. If the normal output voltage of the alternating current generator is low, the diodes 88 and 90 can be eliminated.

By proper selection of the values for the components thereof, the control system of the present invention can be made to provide a wide range of firing angles for the controlled rectifier 76. Thus, where the resistors 78 and 86, respectively, have resistances of 15,000 and 100,000 ohms, and where the normal output voltage of the alternating current generator is about 250 volts, adjustment of the movable contact of the potentiometer 26 can provide a range of firing angles for the controlled rectifier 76 of from about 20 to about 160°. If the resistance of resistor 78 is made smaller, firing angles greater than 160° can be provided for the controlled rectifier 76.

The alternating current generator shown by the drawing has three phases in the armature winding thereof. Where desired, more or fewer phases could be provided for that winding.

The Q of the primary winding 100 of the transformer 102 should be relatively high, to enable the series-resonant circuit which includes that primary winding and the capacitor 98 to have a low impedance at resonance. However, that Q should not be so high that variations in rotor speed, at "startup," could keep the frequency of the output voltage of the generator from causing that series-resonant circuit to become resonant.

The transformer 102 is shown as an isolating transformer. However, if desired, an autotransformer could be used in lieu of the isolating transformer 102.

The potentiometer 26 performs a dual function. Specifically, it acts to sense the output voltage of the alternating current generator, and it also helps render the unijunction transistor 54 conductive. In doing so, that potentiometer obviates the need of a separate voltage-sensing element, and also obviates the need of coupling that voltage-sensing element to the firing circuit of the unijunction transistor 54.

The controlled rectifier 76 must "switch" the current flowing through the field winding 74 of the alternating current generator; and hence that controlled rectifier must have an appreciable current-switching capability. The controlled rectifier 28 need only switch the inhibiting current flowing through the capacitor 38; and hence that controlled rectifier can have a current-switching capability which is much smaller than that of the controlled rectifier 76.

Whereas the drawing and accompanying description have shown and described a preferred embodiment of the present invention it should be apparent to those skilled in the art that various changes may be made in the form of the invention without affecting the scope thereof.

I claim:

1. A control system for an electric generator which comprises:
   a. a variable impedance connected to the field winding and to the armature winding of said generator to enable said armature winding to supply power to said field winding,
   b. said variable impedance having an adjustable firing angle to control the "on" time of said variable impedance and thereby determine the amount of power which said variable impedance enables said armature winding to supply to said field winding,
   c. a firing circuit for said variable impedance which includes an energy-storing member and which stores actuating energy in said energy-storing member,
   d. a second variable impedance that is connected to said armature winding and that has an adjustable firing angle,
   e. said second variable impedance being connected to said energy-storing member to store inhibiting energy within said energy-storing member, and
   f. an adjustable element which can be adjusted to adjust the firing angle of said second variable impedance,
   g. said second variable impedance storing inhibiting energy in said energy-storing member and said firing circuit thereafter dissipating said inhibiting energy and then storing actuating energy in said energy-storing member,
   h. The first said variable impedance being held nonconductive whenever inhibiting energy is stored within said energy-storing element but being fired whenever a predetermined amount of actuating energy is stored within said energy-storing member,
   i. said adjustable element being adjustable to vary the firing angle of said second variable impedance and thus adjust the amount of inhibiting energy stored within said energy-storing member, and said firing circuit responding to varying amounts of inhibiting energy stored within said energy-storing member to vary the firing angle of the first said variable impedance and thus the amount of power which the first said variable impedance enables said armature winding to supply to said field winding,
   j. said armature winding applying power of a given polarity to the first said variable impedance while it applies power of the opposite polarity to said second variable impedance,
   k. said armature winding thereafter applying power of said given polarity to said second variable impedance while it applies power of said opposite polarity to the first said variable impedance,
   l. whereby the first said variable impedance can be rendered conductive only when said second variable impedance is nonconductive and whereby said second variable impedance can be rendered conductive only when the first said variable impedance is nonconductive.

2. A control system for an electric generator as claimed in claim 1 wherein said variable impedances are controlled rectifiers and said adjustable element is an adjustable resistor.

3. A control system for an electric generator as claimed in claim 1 wherein said adjustable element is an adjustable resistor and is part of the firing circuit of said second variable impedance.

4. A control system for an electric generator as claimed in claim 1 wherein said adjustable element is part of the firing circuit of said second variable impedance, said adjustable element acting to sense the output voltage of said generator and also to help fire said second variable impedance.

5. A control system for an electric generator which comprises:
   a. a variable impedance connected to the field winding of said generator to supply power to said field winding,
   b. said variable impedance having an adjustable firing angle to control the "on" time of said variable impedance and thereby determine the amount of power which said variable impedance supplies to said field winding,
   c. a firing circuit for said variable impedance which includes an energy-storing member and which stores actuating energy in said energy-storing member,
   d. a second variable impedance that has an adjustable firing angle,
   e. said second variable impedance being connected to said energy-storing member to store inhibiting energy within said energy-storing member, and
   f. an adjustable element which can be adjusted to adjust the firing angle of said second variable impedance,
   g. said second variable impedance storing inhibiting energy in said energy-storing member and said firing circuit thereafter dissipating said inhibiting energy and then storing actuating energy in said energy-storing member,
   h. the first variable impedance being held nonconductive whenever inhibiting energy is stored within said energy-storing element but being fired whenever a predetermined amount of actuating energy is stored within said energy-storing member,
   i. said adjustable element being adjustable to vary the firing angle of said second variable impedance and thus adjust the amount of inhibiting energy stored within said energy-storing member, and said firing circuit responding to varying amounts of inhibiting energy stored within said energy-storing member to vary the firing angle of the first said variable impedance and thus the amount of power which the first said variable impedance supplies to said field winding,
   j. said energy-storing member being a capacitor,
   k. said second variable impedance charging said capacitor with one polarity, and
   l. said firing circuit discharging said capacitor and then charging said capacitor with the opposite polarity.

6. A power amplifier which comprises:
   a. a variable impedance connected to an AC voltage supply to receive AC and to supply power to a load,
   b. said variable impedance having a controllable firing angle to control the "on" time of said variable impedance and thereby determine the amount of power which said variable impedance enables said AC voltage supply to supply to said load, c. a firing circuit for said variable impedance which includes an energy-storing member,
d. said firing circuit controlling the firing angle of said variable impedance, and thereby determining the amount of power which said variable impedance enables said AC voltage supply to supply to said load, in response to the energy stored in said energy-storing member,
e. a second variable impedance that has an adjustable firing angle and that can be fired to store energy in said energy-storing member,
f. a second firing circuit which determines the firing angle of second variable impedance, and
g. means to adjust the firing angle of said second variable impedance and thereby adjust the amount of energy stored in said energy-storing member, and thus adjust the firing angle and "on" time of the first said variable impedance,
h. the first said variable impedance having power of a given polarity applied to it while said second variable impedance is having power of the opposite polarity applied to it,
i. said second variable impedance thereafter having power of said given polarity applied to it while the first said variable impedance is having power of said opposite polarity applied to it,
j. whereby the first said variable impedance can be rendered conductive only when said second variable impedance is nonconductive and whereby said second variable impedance can be rendered conductive only when the first said variable impedance is nonconductive.

7. A power amplifier as claimed in claim 6 wherein said second firing circuit includes a second energy-storing member, and wherein an input signal supplies energy to said second energy-storing member to cause said second firing circuit to fire said second variable impedance.

8. A power amplifier as claimed in claim 6 wherein said second firing circuit includes a second energy-storing member, wherein an input signal supplies energy to said second energy-storing member to cause said second firing circuit to fire said second variable impedance, wherein a regulating system supplies said input signal and thus supplies energy to said second energy-storing member, and wherein an adjustable element provides an adjustable reference, said regulating system responding to said adjustable reference to closely regulate said input signal.